US011579876B2

(12) United States Patent
Acharya et al.

(10) Patent No.: US 11,579,876 B2
(45) Date of Patent: Feb. 14, 2023

(54) REDUCING SAVE RESTORE LATENCY FOR POWER CONTROL BASED ON WRITE SIGNALS (71) Applicants: ADVANCED MICRO DEVICES, INC., Santa Clara, CA (US); ATI TECHNOLOGIES ULC, Markham (CA)

(72) Inventors: Anirudh R. Acharya, San Diego, CA (US); Alexander Fuad Ashkar, Orlando, FL (US); Ashkan Hosseinzadeh Namin, Markham (CA)

(73) Assignees: Advanced Micro Devices, Inc., Santa Clara, CA (US); ATI TECHNOLOGIES ULC, Markham (CA)

(*) Notice: Subject to any disclaimer, the term of this patent is extended or adjusted under 35 U.S.C. 154(b) by 39 days.

(21) Appl. No.: 17/008,006

(22) Filed: Aug. 31, 2020

(65) Prior Publication Data
US 2022/0043653 A1 Feb. 10, 2022

Related U.S. Application Data (60) Provisional application No. 63/061,463, filed on Aug. 5, 2020.

(51) Int. Cl.
*G06F 9/30* (2018.01)
*G06F 9/48* (2006.01)
(Continued)

(52) U.S. Cl.
CPC ........ *G06F 9/30083* (2013.01); *G06F 1/3296* (2013.01); *G06F 9/30105* (2013.01);
(Continued)

(58) Field of Classification Search
CPC .... G06F 1/3296; G06F 1/3203; G06F 1/3215; G06F 1/3231; G06F 1/3234; G06F 1/32; G06F 1/3287; G06F 1/3293; G06F 9/30083; G06F 9/30105; G06F 9/4806; G06F 9/542
See application file for complete search history.

(56) References Cited

U.S. PATENT DOCUMENTS 8,190,939 B2 * 5/2012 Fields, Jr. ............. G06F 9/5094
713/323
8,656,198 B2 * 2/2014 Branover ............... G11C 5/148
713/323

(Continued)

*Primary Examiner* — Raymond N Phan (57) ABSTRACT

A method of save-restore operations includes monitoring, by a power controller of a parallel processor (such as a graphics processing unit), of a register bus for one or more register write signals. The power controller determines that a register write signal is addressed to a state register that is designated to be saved prior to changing a power state of the parallel processor from a first state to a second state having a lower level of energy usage. The power controller instructs a copy of data corresponding to the state register to be written to a local memory module of the parallel processor. Subsequently, the parallel processor receives a power state change signal and writes state register data saved at the local memory module to an off-chip memory prior to changing the power state of the parallel processor.

20 Claims, 4 Drawing Sheets (51) Int. Cl.
  *G06F 13/16* (2006.01)
  *G06F 11/30* (2006.01)
  *G06F 1/3296* (2019.01)
  *G06F 9/54* (2006.01)

(52) U.S. Cl.
  CPC ............ *G06F 9/4806* (2013.01); *G06F 9/542* (2013.01); *G06F 11/3027* (2013.01); *G06F 11/3062* (2013.01); *G06F 13/1605* (2013.01)

(56) References Cited

U.S. PATENT DOCUMENTS

| | | | |
|---|---|---|---|
| 9,213,401 B2 * | 12/2015 | Sakarda | G06F 1/3287 |
| 9,390,461 B1 * | 7/2016 | Jane | G06F 9/442 |
| 2011/0082987 A1 * | 4/2011 | Sauber | G06F 11/1451 |
| | | | 713/323 |
| 2012/0144144 A1 * | 6/2012 | Worthington | G06F 3/0653 |
| | | | 711/170 |
| 2014/0032947 A1 * | 1/2014 | Ahmad | G06F 1/3275 |
| | | | 713/320 |
| 2014/0189240 A1 * | 7/2014 | Keppel | G06F 12/0804 |
| | | | 711/122 |
| 2014/0282580 A1 * | 9/2014 | Zeng | G06F 3/0631 |
| | | | 718/104 |
| 2017/0329385 A1 * | 11/2017 | Park | G06F 1/3225 |
| 2018/0239635 A1 * | 8/2018 | Ashkar | G06F 9/4881 |

* cited by examiner

REDUCING SAVE RESTORE LATENCY FOR POWER CONTROL BASED ON WRITE SIGNALS

CROSS-REFERENCE TO RELATED APPLICATIONS

The present application claims priority to Provisional Patent Application Ser. No. 63/061,463, entitled "Reducing Save Restore Latency for Power Control" and filed on Aug. 5, 2020, the entirety of which is incorporated by reference herein.

BACKGROUND

As the functionality of portable computing devices (e.g., mobile telephones, laptop computers, and the like) increases, more energy is consumed by the various internal components needed to support the processing power required for implementing various functions of the devices. To save power during periods of reduced use or less intensive computing operations, mobile devices have incorporated various power saving techniques, including supporting different power modes that processors can enter to conserve power. For example, some mobile devices are able to transition processors to a retention state or power collapsed state during periods of reduced activity, thereby reducing power consumption and mitigating thermal energy generation.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

To increase power efficiency, mobile devices are often configured to place one or more device resources in a low power state whenever possible, such as when the processor is in an idle state. Placing a device resource in a low power state sometimes includes de-energizing or reducing the operations of the resource whenever the processor is not actively processing tasks. Such low power modes include idle states, active-sleep states, sleep states, deep-sleep states, power collapsed states, and the like. Power collapse refers to the powering down of circuit blocks/processing units when not needed to reduce leakage current and conserve power. To implement power collapse, the circuit blocks/processing units within an integrated circuit (IC) are partitioned into multiple power domains. A power domain is sometimes designated as, for example, "always-on" or "collapsible".

An always-on power domain is powered on at all times, whereas a collapsible power domain can be powered off if the processing units in the power domain are not needed.

A set of tasks is typically performed for powering down the collapsible power domains. For example, powering down tasks include saving pertinent hardware registers of the collapsible power domains, freezing output pins of the IC to minimally disturb external units coupled to the IC, clamping input pins of the collapsed power domains, powering down a main oscillator and disabling a main clock from the oscillator, and the like. A complementary set of tasks is typically performed for powering up the collapsed power domains. For example, the powering up tasks include powering up the main oscillator and enabling the main clock, restoring software, firmware, and hardware states, releasing input and output pins, and so on. Changing of power modes conventionally includes time latencies associated with performance of such tasks.

To improve overall system performance by reducing latency associated with powering down collapsible domains, FIGS. 1-4 describe systems and methods for register bus snooping in parallel to register programming in collapsible power domains and saving a copy of pertinent register data at a single memory module. In some embodiments, the saved register data is transferred, from the single memory module, to off-chip memory after receiving a power down signal without needing to read out register data from multiple different register file locations in a serialized manner, thereby allowing for faster save-restore operations by reducing the latency associated with saving state prior to entering a low-power state. In other embodiments, the single memory module is positioned in an always-on power domain and the saved register data is retained locally and allows for time-efficient state restore operations. In various embodiments, a method of save-restore operations includes monitoring, by a power controller of a parallel processor, of a register bus for one or more register write signals. The power controller determines that a register write signal is addressed to a state register that is designated to be saved prior to changing a power state of the GPU from a first state to a second state having a lower level of energy usage. Thus, the power controller instructs a copy of data corresponding to the state register to be written to a local memory module of the GPU. Subsequently, the GPU receives a power state change signal and writes state register data saved at the local memory module to an off-chip memory prior to changing the power state of the GPU. By reducing power down latency and increasing the number of times that a device can enter a lower-power state (e.g., adjusting the power mode of a processor from an active mode to a retention mode or power collapsed mode), average power consumption of devices is reduced.

Figure 1:
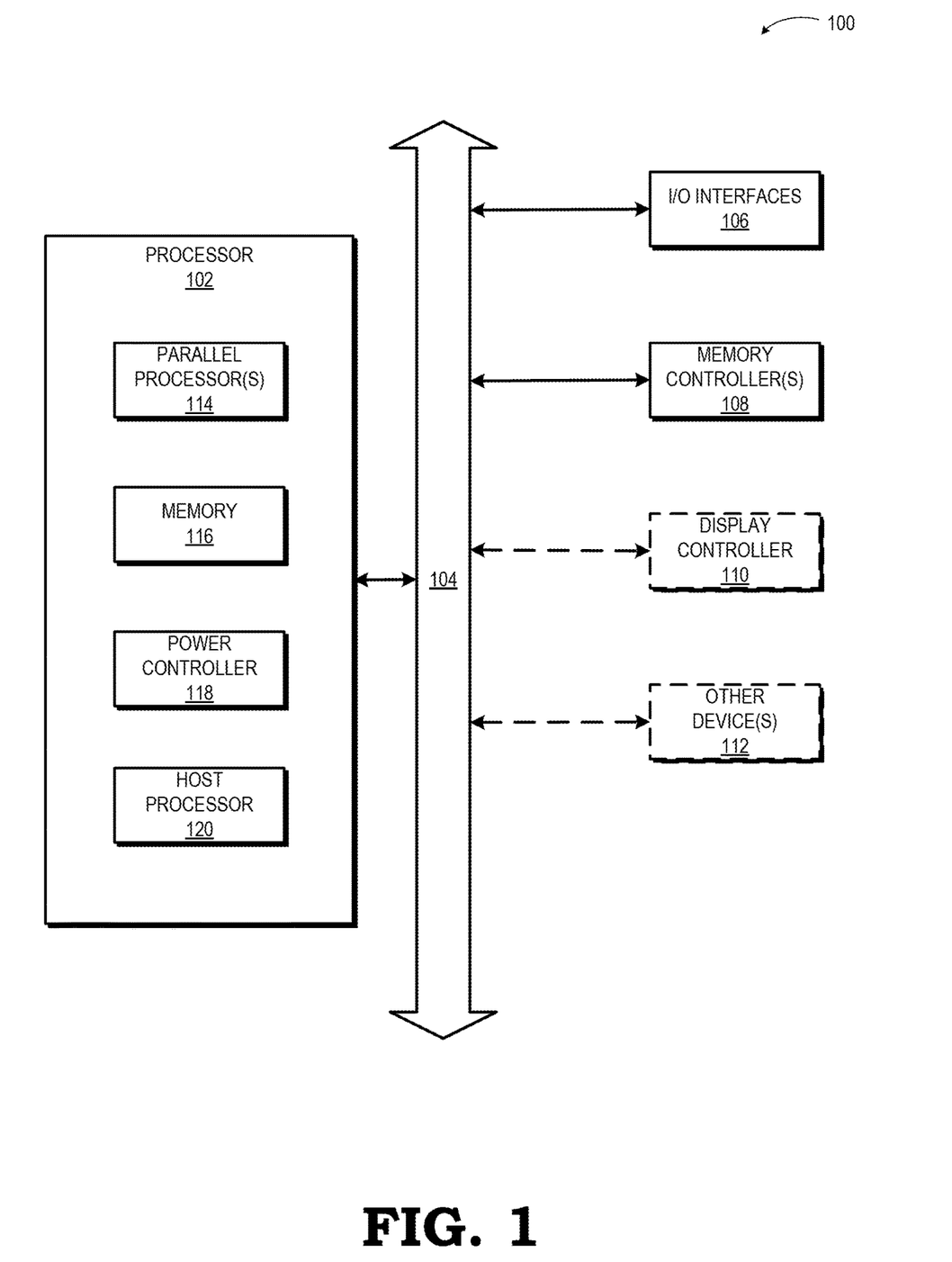
FIG. 1 is a block diagram of a processing system for employing power state management with parallel processors in accordance with some embodiments.

FIG. 1 illustrates a block diagram of a computing system 100 for employing power state management in accordance with some embodiments. In various embodiments, computing system 100 includes at least one or more processors 102, fabric 104, input/output (I/O) interfaces 106, memory controller(s) 108, display controller 110, and other device(s) 112. It should be noted that, as indicated by the dashed lines in FIG. 1, the display controller 110 and other device(s) 112 are optional components of computing system 100. In various embodiments, computing system 100 includes a computer, laptop, mobile device, server, or any of various other types of computing systems or devices. It is noted that the number of components of computing system 100 vary in some embodiments. It is also noted that in some embodiments computing system 100 includes other components not shown in FIG. 1. Additionally, in other embodiments, computing system 100 is be structured in other ways than shown in FIG. 1.

Fabric 104 is representative of any communication interconnect that complies with any of various types of protocols utilized for communicating among the components of the computing system 100. Fabric 104 provides the data paths, switches, routers, and other logic that connect the processors 102, I/O interfaces 106, memory controller(s) 108, display controller 110, and other device(s) 112 to each other. Fabric 104 handles the request, response, and data traffic, as well as probe traffic to facilitate coherency. Fabric 104 also handles interrupt request routing and configuration access paths to the various components of computing system 100. Additionally, fabric 104 handles configuration requests, responses, and configuration data traffic. In some embodiments, fabric 104 is bus-based, including shared bus configurations, crossbar configurations, and hierarchical buses with bridges. In other embodiments, fabric 104 is packet-based, and hierarchical with bridges, crossbar, point-to-point, or other interconnects. From the point of view of fabric 104, the other components of computing system 100 are referred to as "clients". Fabric 104 is configured to process requests generated by various clients and pass the requests on to other clients.

Memory controller(s) 108 are representative of any number and type of memory controllers coupled to any number and type of memory device(s). For example, the type of memory device(s) coupled to memory controller(s) 108 include Dynamic Random Access Memory (DRAM), Static Random Access Memory (SRAM), NAND Flash memory, NOR flash memory, Ferroelectric Random Access Memory (FeRAM), or others. Memory controller(s) 108 are accessible by processors 102, I/O interfaces 106, display controller 110, and other device(s) 112 via fabric 104. I/O interfaces 106 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices are coupled to I/O interfaces 106. Such peripheral devices include (but are not limited to) displays, keyboards, mice, printers, scanners, joysticks or other types of game controllers, media recording devices, external storage devices, network interface cards, and so forth. Other device(s) 112 are representative of any number and type of devices (e.g., multimedia device, video codec).

In various embodiments, to support execution of instructions for graphics and other types of workloads, the processor 102 includes one or more parallel processors 114 (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like), a memory 116, a power controller 118, and a host processor 120, such as a central processing unit (CPU). Although for clarity the memory 116 and the power controller 118 are illustrated separately from the one or more parallel processors 114 in FIG. 1, in some embodiments the memory 116 and the power controller 118 are part of the one or more parallel processors 114 (e.g., part of the same integrated circuit die on which the one or more parallel processors 114 is implemented). In some embodiments, the processor 102 includes additional modules, not illustrated in FIG. 1, to facilitate execution of instructions, including one or more additional processing units such as one or more central processing units (CPUs), additional GPUs, one or more digital signal processors and the like. In addition, the processor 102 can include memory and input/output interface modules, such as a northbridge and a southbridge, additional memory to provide caches and other supporting memory structures for the processing units, and the like.

As described in more detail with respect to FIGS. 2-4 below, in various embodiments, the one or more parallel processors 114 performs register bus snooping in parallel to register programming and saving a copy of pertinent register data at a single memory module. The saved register data is transferred to off-chip memory after receiving a power down signal and allows for faster save-restore operations by reducing the latency associated with saving state prior to entering a low-power state. In various embodiments, a method of save-restore operations includes monitoring, by a power controller of a graphics processing unit (GPU), of a register bus for one or more register write signals. The power controller determines that a register write signal is addressed to a state register that is designated to be saved prior to changing a power state of the GPU from a first state to a second state having a lower level of energy usage. Thus, the power controller instructs a copy of data corresponding to the state register to be written to a local memory module of the GPU. It should be recognized that although described herein the particular context of a GPU for ease of illustration and description, in various embodiments, the register bus snooping of one or more parallel processors 114 is applicable to any parallel processor without departing from the scope of this disclosure.

Subsequently, the one or more parallel processors 114 receives a power state change signal and writes state register data saved at the local memory module to an off-chip memory prior to changing the power state of the one or more parallel processors 114. By reducing power down latency and increasing the number of times that a device can enter a lower-power state (e.g., adjusting the power mode of a processor from an active mode to a retention mode or power collapsed mode), average power consumption of devices is reduced. Those skilled in the art will recognize that although power state management of collapsible power domains is described here in the context of one or more GPUs, the concepts of snooping register writes for power control is similarly applicable to various other processors without departing from the scope of this disclosure. For example, in various embodiments, the concepts described here is also similarly applicable to other processors including accelerated processing units (APUs), discrete GPUs (dGPUs), other parallel processors, central processing units (CPUs), and the like.

Figure 2:
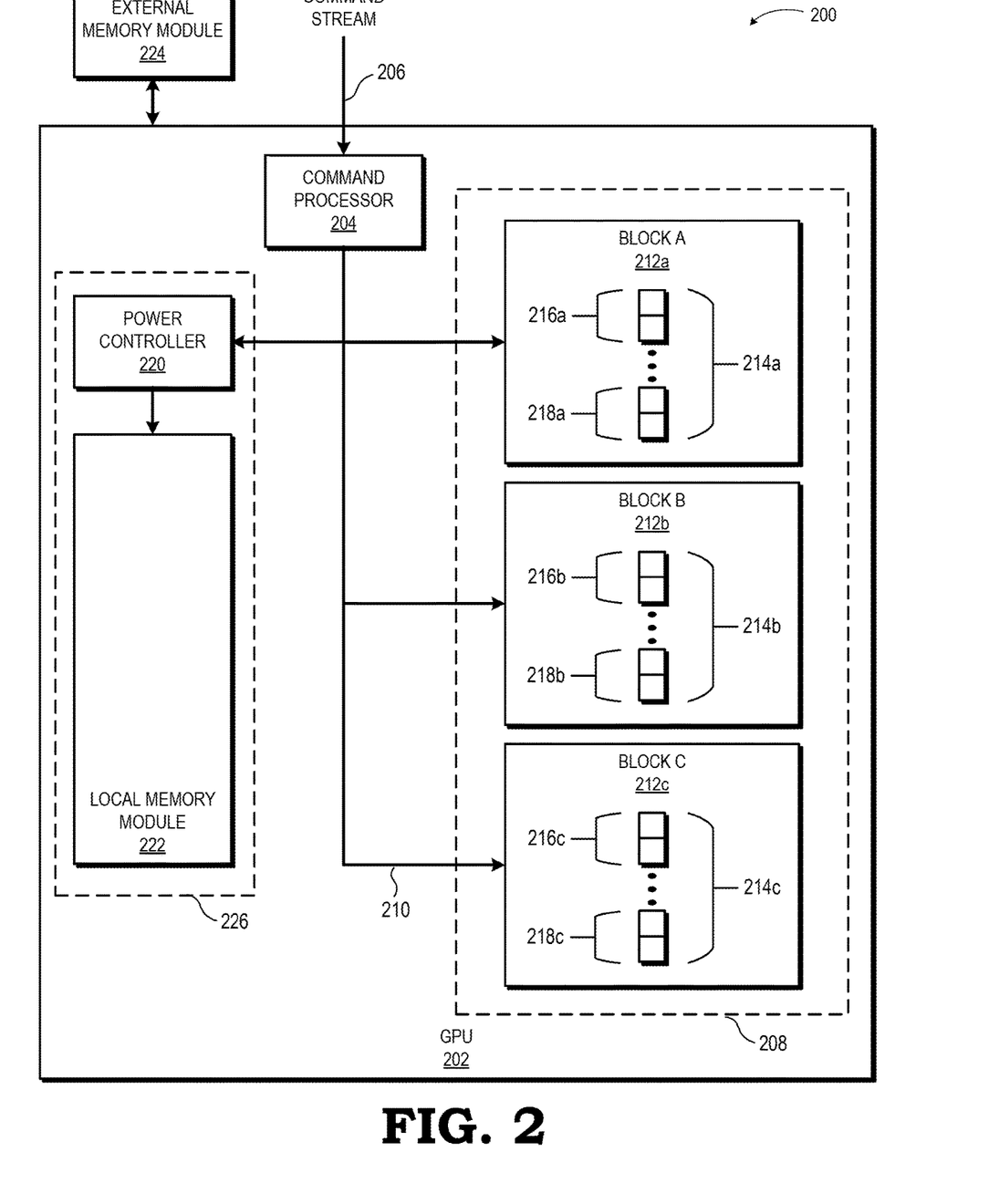
FIG. 2 is a block diagram of a graphics processing unit (GPU) that performs snooping of register writes for power state management in accordance with some embodiments.

FIG. 2 is a block diagram illustrating snooping of register writes for power state management in a GPU in accordance with some embodiments. As shown, the GPU 202 includes a command processor 204 that receives commands in a command stream 206 from, for example, a corresponding device driver (not shown) and coordinates processing within the GPU 202. In various embodiments, the device driver includes software, firmware, hardware, or any combination thereof. In an implementation, the device driver is implemented entirely in software. The device driver provides an interface and/or application programming interface (API) for communications access to the GPU 202.

In various embodiments, the device driver writes command packets with commands corresponding to a task. The commands include draw commands, global state updates, block state updates, and the like. In some embodiment, one or more commands includes a register address. In various embodiments, the command processor 204 is implemented in hardware, firmware, or software, or a combination thereof. In one embodiment, the command processor 204 is implemented as a reduced instruction set computer (RISC) engine with microcode for implementing logic including scheduling logic. Additionally, in various embodiments, the device driver performs hardware initialization and communicates with the GPU 202 to enable the various power modes and snooping of register data as described herein.

The command processor 204 is communicably coupled to one or more GPU subsystems 208 via at least a register bus 210. In various embodiments, the one or more GPU subsystems 208 include various processing blocks such as block A 212*a*, block B 212*b*, and block C 212*c*. As used herein, the term "block" refers to a module included in an ASIC, an execution pipeline of a CPU, and/or a graphics pipeline of a GPU. Such a module includes, but is not limited to, a cache memory, an arithmetic logic unit, a multiply/divide unit, a floating point unit, a geometry shader, a vertex shader, a pixel shader, various other shaders, a clipping unit, a z-buffer (e.g., depth buffer), a color buffer, or some other processing module as would be apparent to a person skilled in the relevant art(s). In various embodiments, register bus 210 provides various commands to blocks 212, including draw commands, state updates, and the like.

In various embodiments, the hardware blocks (e.g., blocks 212) perform specific processing and utilize registers to maintain state information. To facilitate execution, the instruction set architecture (ISA) for the GPU 202 operates on a set of registers. The instructions of the GPU 202 use the registers of these sets as operands to store, for example, execution data to be operated on by instructions and context state data. In various embodiments, each of the blocks 212*a*, 212*b*, and 212*c* include a register file 214*a*, 214*b*, and 214*c*, respectively. In various embodiments, the GPU 202 includes a number of contexts, or operations, related to portions of processing operations being executed as a whole. As described herein, in some embodiments a context represents all the state of the GPU at a time of a last execution (or initial execution) of a process at the GPU 202. In various embodiments, the state includes state registers, cache and memory contents, internal FIFOs, internal registers, and the like at the time of the last switch from one context to a different context. In various embodiments, the registers of the register file(s) 214 stage data between memory and the execution units of the GPU 202.

State updates are written to local registers maintained by the respective blocks. Block A 212*a* writes state updates to registers in register file A 214*a*, block B 212*b* writes state updates to registers in register file B 214*b*, and block C 212*c* writes state updates to registers in register file C 214*c*. In an embodiment, a state update includes a register address. In various embodiments, the command processor 204 receives and decodes commands in command stream 206 and programs registers in the one or more GPU subsystems 208 based on the decoded commands by broadcasting registers over the register bus 210. In various embodiments, the correct GPU subsystem 208 block picks up the broadcasted registers based on register address. For example, in various embodiments, each block 212 determines whether it should write a block state update to its local register file based on the address of the block state update.

In this manner, copies of the context registers are distributed across the GPU 202 architecture and stored in the blocks that need them (e.g., stored in register files 214 at banked RAMs) rather than being stored all together in a single physical RAM. In various embodiments, the GPU 202 includes a hardware block (e.g., one of blocks 212) that manages setting new values that talks to the individual blocks having context registers and broadcasting any updates chip-wide to other blocks 212 needing such updated register data. A person skilled in the relevant art(s) will appreciate that other mechanisms for determining whether a particular block should write a block state update to its local register(s) can be used without deviating from the spirit and scope of the present disclosure.

In various embodiments, such as illustrated in FIG. 2 with respect to block A 212*a* and block B 212*b*, each of the register files includes a first set of state registers 216 designated to be saved prior to changing a power state and a second set of state registers 218 designated as internally-kept state registers. In some embodiments, block state updates are only written to a particular block or blocks 212. For example, in some embodiments, a block state update on register bus 210 is intended only for block A 212*a*. In this example, only block A 212*a* would write the block state update to state registers 218*a* designated as internally-kept state registers in register file A 214*a*. All the other blocks would not write this block state update to a register in their respectively maintained local register files. Further, any updates, changes, and the like to internally-kept state registers 218*a* are maintained locally at register file A 214*a* of block A 212*a* and not broadcast on register bus 210 to other subsystems 208.

As will be appreciated by those skilled in the art, GPU context state save-and-restore is an important part of powering down (or otherwise changing power state). When operating a GPU, a current state and context of a GPU is commonly comprehended as a disjointed set of internal registers, depth buffer contents (such as Z buffer contexts), frame buffer contents, texture map storage buffers, and the like. Context switching within a single operating system image involves a number of serial steps orchestrated by the operating system. In various embodiments, hardware states are saved prior to powering down a collapsible power domains (e.g., GPU 202 or one or more of its subsystems 208). In some embodiments, these hardware states include configuration information for various GPU subsystems 208 and the like. Conventionally, in response to a power down signal, a power controller begins saving context states by reading registers one-by-one from each GPU processing block in a serialized manner and therefore takes multiple cycles to read and save out each register. Further, many context registers have disjointed addresses in the register address space and not all registers need to be saved prior to changing power state (e.g., internally-kept state registers 218).

To reduce latency associated with GPU context state save-and-restore, the GPU 202 includes a local, on-chip power controller 220 (also interchangeably referred to as a 'run list controller' (RLC)) that is communicably coupled to the register bus 210 driven by the command processor 204. In operation, the power controller 220 monitors or 'snoops' on register bus 210 transactions (e.g., register write signals). That is, the power controller 220 sees all register writes that are broadcast on the register bus 210. In various embodiments, the power controller 220 monitors every transaction on the register bus 210 and determines whether a register write signal is addressed to a state register that is designated to be saved prior to changing a power state of the GPU from a first state to a second state having a lower level of energy usage.

For registers that are designated to be saved prior to changing a power state (e.g., first set of state registers 216), the power controller 220 stores a copy of register data in a local memory 222 (e.g., on-chip RAM) in response to detecting that a register write signal broadcast on the register bus 210 is associated with a memory address (such as a predetermined range of addresses) marked to be selectively saved during register programming. That is, a single register write signal from the command processor 204 during register programming triggers a dual writing of registers with a first copy written to an intended GPU subsystem 208 based on a decoded command and a second copy written to a different local memory. In contrast, when the power controller 220 detects registers that are designated to be selectively discarded (upon power collapse or changing to a lower power state), only a single copy is written to the intended GPU subsystem 208 based on the decoded command as per conventional register programming.

That is, as the command processor 204 updates the state of the GPU 202 via register writes across the register bus 210, the power controller 220 saves the same register writes into its local memory 222. In this manner, the GPU 202 always has the latest copy of programmed registers saved at a single location. In various embodiments, the hardware states of the saved registers are saved in state registers within the power controller 220, the on-chip local memory 222, or an external memory 224 prior to powering down. The register data saved at that single location in the local memory 222 is, in various embodiments, subsequently bulk transferable or otherwise transferable with a greater speed to external memory 224 without reading registers one-by-one from each GPU processing block in a serialized manner and therefore taking multiple cycles to read and save out register data. In some embodiments, the local memory 222 and/or the state registers of a memory module (not shown) local to the power controller 220 are positioned within an always-on power domain 226 and the saved register data is retained locally within the GPU 202 without requiring transfer of snooped register state data to the external memory 224. For example, in various embodiments, memory within the always-on power domain 226 remains powered and retains register state data even after other components within power collapsible domains (e.g., blocks 212 and the like) are powered-down or powered-off. Upon powering up after a sleep, the hardware states are restored by retrieving hardware state registers that were previously saved (e.g., from any of the state registers within the power controller 220, the on-chip local memory 222, or the external memory 224).

Figure 3:
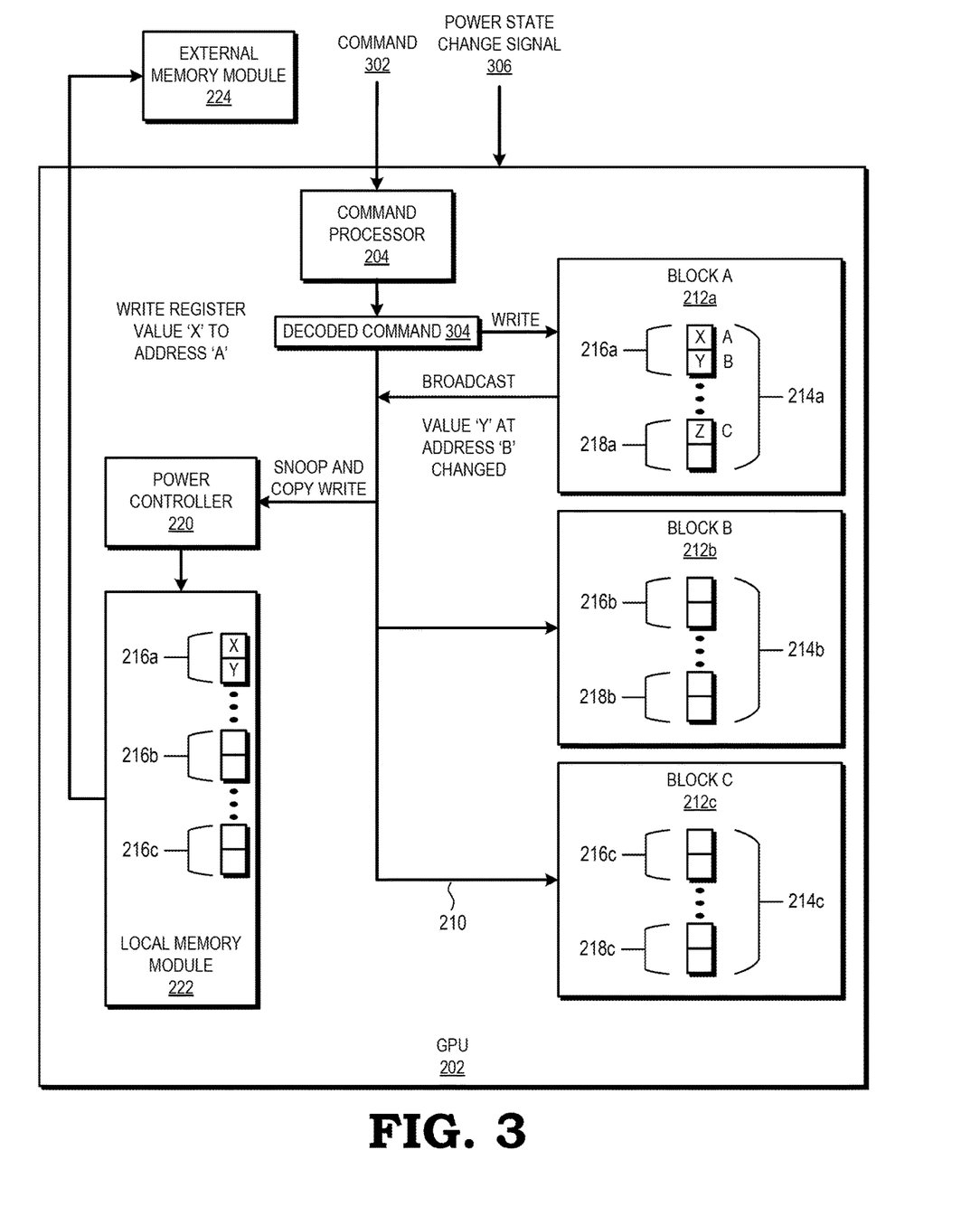
FIG. 3 is a block diagram illustrating an example of snooping of register writes for power state management in a GPU in accordance with some embodiments.

Referring now to FIG. 3 and with continued reference to FIG. 2, illustrated is a block diagram of register bus snooping during register programming in accordance with some embodiments. As shown, the GPU 202 includes a command processor 204 that receives commands in a command stream 206 from, for example, a scheduler (not shown) and coordinates processing within the GPU 202. The command processor 204 is communicably coupled to one or more GPU subsystems 208 via at least a register bus 210. In various embodiments, the one or more GPU subsystems 208 include various processing blocks such as block A 212a, block B 212b, and block C 212c. In various embodiments, the hardware blocks (e.g., blocks 212) perform specific processing and utilize registers to maintain state information. In various embodiments, each of the blocks 212a, 212b, and 212c include a register file 214a, 214b, and 214c, respectively.

In some embodiments, the command processor 204 receives a command 302 from the command stream 206 and decodes the command 302 to generate a decoded command 304. As shown, the decoded command 304 is broadcast on the register bus 210 instructing to write register value 'X' to register address 'A'. In this example, register address 'A' is positioned at the register file 214a of block A 212a because the address of the decoded command 304 falls within a predetermined address range corresponding to block A. Accordingly, block A 212a writes the register value 'X'. Additionally, register address 'A' is positioned at the first set of state registers 216 of register file 214a that are designated to be saved prior to changing a power state. Accordingly, the power controller 220 also writes a copy of the register value 'X' to be saved at the local memory 222 after snooping the register bus 210.

In various embodiments, the term 'state' refers an initial state, an intermediate state, and/or a final state. An initial state is a starting point for the GPU 202 to process an input data set according to a programming order to create an output set of data. There is an intermediate state, for example, that is stored at several points to enable the processing to make forward progress. This intermediate state is sometimes stored to allow a continuation of execution at a later time when interrupted by some other process. There is also final state that can be recorded as part of the output data set. Thus, in some embodiments, after processing by block A 212a, one or more registers in the register file 214a are updated.

As illustrated in FIG. 3, the registers at register addresses 'B' and 'C' are updated during processing by block A 212a to the values of 'Y' and 'Z', respectively. The register address 'B' is positioned at the first set of state registers 216 of register file 214a that are designated to be saved prior to changing a power state. Accordingly, block A 212a broadcasts the state change as reflected in value 'Y' to the register bus 210. Subsequently, the power controller 220 also writes a copy of the register value 'Y' to be saved at the local memory 222 after snooping the register bus 210. However, the register address 'C' is positioned at the second set of state registers 218 of register file 214a that are designated as internally-kept state registers. Thus, block A 212a does not broadcast the state change as reflected in value 'Z' at register address 'C' to the register bus 210.

Subsequently, in some embodiments, in response to a state saving trigger of receiving a power state change signal 306, the power controller 220 signals the local memory 222 to transfer saved contents including registers with values of 'X' and 'Y' for register addresses 'A' and 'B', respectively, of block 212A to the external memory 224. The state saving trigger, in various embodiments, includes a wide variety of different forms including the ability to initiate state saving in response to execution of a state saving program instruction. In particular, the state saving trigger signals to the power controller 220 to initiate a sequence of store instructions to save state data (e.g., contents, program status values, program counter values, configuration register values, and the like) that had previously been saved at the local memory 222 (from snooping) to the external memory 224. After state data has been saved to external memory 224, the GPU 202 proceeds with the power state change (including power collapse or transitioning to a lower power state).

In other embodiments, the local memory 222 and/or the state registers of a memory module (not shown) local to the power controller 220 are positioned within an always-on power domain 226 and the saved register data is retained locally within the GPU 202 without requiring transfer of snooped register state data to the external memory 224. For example, in various embodiments, memory within the always-on power domain 226 remains powered and retains register state data even after other components within power collapsible domains (e.g., blocks 212 and the like) are powered-down or powered-off In such embodiments, the GPU 202 proceeds with the power state change (including power collapse or transitioning to a lower power state) in response to receiving a power state change signal 306 without requiring saving of state data to external memory 224 and/or needing to read out register data from multiple different register file locations in a serialized manner, thereby allowing for faster save-restore operations by reducing the latency associated with saving state prior to entering a low-power state.

Figure 4:
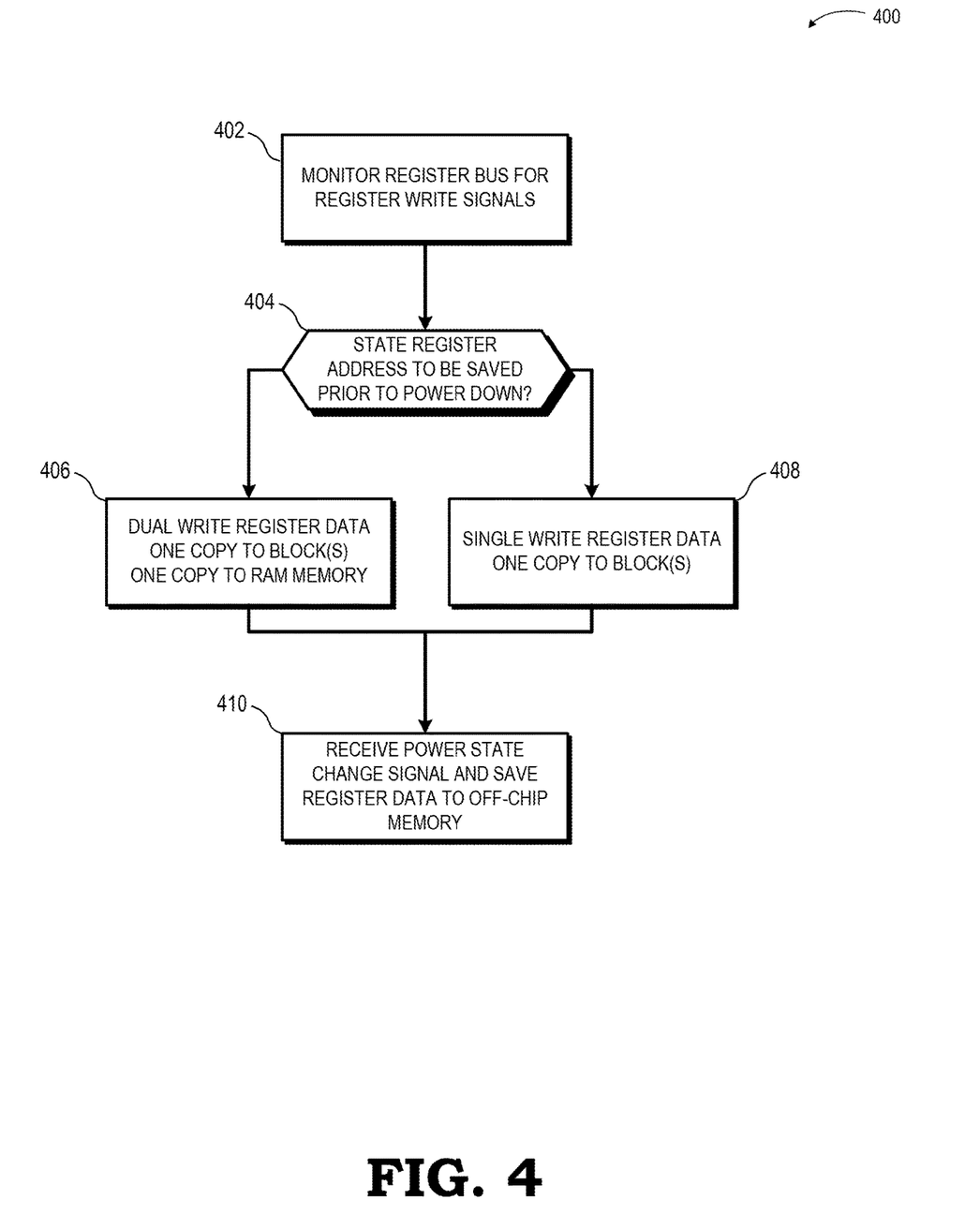
FIG. 4 is a flow diagram of a method of snooping of register writes for power state management in a GPU in accordance with some embodiments.

FIG. 4 is a block diagram of a method 400 of snooping of register writes for power state management in a GPU in accordance with some embodiments. For ease of illustration and description, the method 400 is described below with reference to and in an example context of the system 100 and GPU 202 of FIG. 1 and FIG. 2. However, the method 400 is not limited to these example contexts, but instead in different embodiments is employed for any of a variety of possible system configurations using the guidelines provided herein.

The method beings at block 402 with the monitoring, by a power controller of a graphics processing unit (GPU), of a register bus for one or more register write signals. In various embodiments, such as illustrated in FIG. 2, a command processor 204 receives and decodes commands in command stream 206 and programs registers in the one or more GPU subsystems 208 based on the decoded commands by broadcasting registers over the register bus 210. The power controller 210 monitors or snoops on register bus 210 transactions (e.g., register write signals). That is, the power controller 220 sees all register writes that are broadcast on the register bus 210. In various embodiments, the power controller 220 monitors every transaction on the register bus 210 and determines whether a register write signal is addressed to a state register that is designated to be saved prior to changing a power state of the GPU from a first state to a second state having a lower level of energy usage. This disclosure, however, is not limited to the embodiments explicitly described herein. A person skilled in the relevant art will appreciate that in other embodiments other mechanisms for snooping register writes broadcast on the register bus are used without deviating from the spirit and scope of the present disclosure.

At block 404, the power controller determines whether a register write signal broadcast on the register bus is addressed to a state register that is designated to be saved prior to changing a power state of the GPU from a first state to a second state having a lower level of energy usage. For example, such as illustrated in FIG. 2 with respect to block A 212a and block B 212b, each of the register files includes a first set of state registers 216 designated to be saved prior to changing a power state and a second set of state registers 218 designated as internally-kept state registers. In some embodiments, block state updates are only written to a particular block or blocks 212. For example, in some embodiments, a block state update on register bus 210 is intended only for block A 212a. In this example, only block A 212a would write the block state update to state registers 218a designated as internally-kept state registers in register file A 214a. All the other blocks would not write this block state update to a register in their respectively maintained local register files. Further, any updates, changes, and the like to internally-kept state registers 218a are maintained locally at register file A 214a of block A 212a and not broadcast on register bus 210 to other subsystems 208.

The method 400 proceeds to block 406 in response to determining that the register write signal broadcast on the register bus is addressed to a state register that is designated to be saved prior to changing a power state of the GPU from a first state to a second state having a lower level of energy usage. For registers that are designated to be saved prior to changing a power state (e.g., first set of state registers 216), the power controller 220 stores a copy of register data in a local memory 222 (e.g., on-chip RAM) in response to detecting that a register write signal broadcast on the register bus 210 is associated with a memory address (such as a predetermined range of addresses) marked to be selectively saved during register programming. That is, a single register write signal from the command processor 204 during register programming triggers a dual writing of registers with a first copy written to an intended GPU subsystem 208 based on a decoded command and a second copy written to a different local memory.

With respect to FIG. 3, the power controller 220 determines a decoded command 304 is broadcast on the register bus 210 instructing to write register value 'X' to register address 'A'. In this example, register address 'A' is positioned at the register file 214a of block A 212a because the address of the decoded command 304 falls within a predetermined address range corresponding to block A. Accordingly, block A 212a writes the register value 'X'. Additionally, register address 'A' is positioned at the first set of state registers 216 of register file 214a that are designated to be saved prior to changing a power state. The power controller 220 also writes a copy of the register value 'X' to be saved at the local memory 222 after snooping the register bus 210.

In contrast, method 400 proceeds to block 408 in response to determining that the register write signal broadcast on the register bus is addressed to a state register that is designated to be internally kept within a block. When the power controller 220 detects registers that are designated to be internally kept within a block and selectively discarded (upon power collapse or changing to a lower power state), only a single copy is written to the intended GPU subsystem 208 based on the decoded command as per conventional register programming.

At block 410, in various embodiments, the GPU receives a power state change signal and writes state register data saved at the local memory module to an off-chip memory prior to changing the power state of the GPU. With respect to FIG. 3, in response to a state saving trigger of receiving a power state change signal 306, the power controller 220 signals the local memory 222 to transfer saved contents including registers with values of 'X' and 'Y' for register addresses 'A' and 'B', respectively, of block 212A to the external memory 224. The state saving trigger, in various embodiments, includes a wide variety of different forms including the ability to initiate state saving in response to execution of a state saving program instruction. In particular, the state saving trigger signals to the power controller 220 to initiate a sequence of store instructions to save state data (e.g., contents, program status values, program counter values, configuration register values, and the like) that had previously been saved at the local memory 222 (from snooping) to the external memory 224. In various embodiments, the writing of state register data saved at the local memory module includes a burst mode transfer, scanning out, or other similar mechanism of dumping saved register data to an off-chip memory. In contrast, conventional state saving includes processing in which scan chains are serially advanced across multiple register files in multiple different processing blocks to be saved off to memory. In various embodiments, after state data has been saved to external memory 224, the GPU 202 proceeds with the power state change (including power collapse or transitioning to a lower power state).

In other embodiments, such as described with respect to always-on power domain 226 of FIG. 2, the local memory 222 and/or the state registers of a memory module (not shown) local to the power controller 220 are positioned within an always-on power domain 226 and the saved register data is retained locally within the GPU 202 without requiring transfer of snooped register state data to the external memory 224. For example, in various embodiments, memory within the always-on power domain 226 remains powered and retains register state data even after other components within power collapsible domains (e.g., blocks 212 and the like) are powered-down or powered-off. In such embodiments, the GPU 202 proceeds with the power state change (including power collapse or transitioning to a lower power state) in response to receiving a power state change signal 306 without requiring saving of state data to external memory 224 and/or needing to read out register data from multiple different register file locations in a serialized manner, thereby allowing for faster save-restore operations by reducing the latency associated with saving state prior to entering a low-power state.

When all of the state data has been saved (e.g., through saving to a local memory of the GPU in a power domain that is not powered down or by transferring state data to external memory 224), then the power controller 220 initiates the power down of the GPU 202 with the required state defining data safely saved. The saved state data, in various embodiments, is subsequently used to restore GPU hardware registers by retrieving the saved register states from, for example, local memory 222 or external memory 224. In some embodiments, the power state change signal is a power collapse signal that instructs the powering down circuit blocks/processing units in GPU 202 to reduce leakage current and conserve power. However, those skilled in the art will recognize that the bus snooping described here is applicable to any transition from a power state to a different power state having a lower level of energy usage.

Accordingly, as described herein, methods of register bus snooping in parallel to register programming and saving a copy of pertinent register data at a single memory module allows for faster save-restore operations by reducing the latency associated with saving state prior to entering a low-power state. Notably, one of ordinary skill in the art will recognize that reducing power down latency and increasing the number of times that a device can enter a lower-power state (e.g., adjusting the power mode of a processor from an active mode to a retention mode or power collapsed mode) will often result in an average savings in power consumption. This is particularly helpful for power constrained devices (e.g., mobile devices, APUs, and the like) and also benefits dGPUs by facilitating duty cycling and speeding the power down process. Additionally, the snooping mechanism described here allows for reducing power down latency without developing new burst protocols or a separate word bus that would incur design/area penalty and deviates from current register programming protocols.

A computer readable storage medium includes any non-transitory storage medium, or combination of non-transitory storage media, accessible by a computer system during use to provide instructions and/or data to the computer system. Such storage media include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software include the instructions and certain data that, when executed by the one or more processors, manipulate the one or more processors to perform one or more aspects of the techniques described above. The non-transitory computer readable storage medium include, for example, a magnetic or optical disk storage device, solid state storage devices such as Flash memory, a cache, random access memory (RAM) or other non-volatile memory device or devices, and the like. The executable instructions stored on the non-transitory computer readable storage medium include source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   determining, based on detecting one or more register write signals, that a register write signal is addressed to a state register that is designated to be saved prior to changing a power state of a parallel processor from a first state to a second state having a lower level of energy usage; and writing, based at least in part on the determining, a copy of data corresponding to the state register to a local memory of the parallel processor.

2. The method of claim 1, wherein detecting the one or more register write signals comprises a power controller of the parallel processor monitoring a register bus for register writes broadcast on the register bus.

3. The method of claim 1, further comprising:
receiving, at a command processor of the parallel processor, a command from a command stream; and
transmitting, based at least in part on the command, the register write signal from the command processor via a register bus.

4. The method of claim 3, further comprising:
decoding, at the command processor, the command from the command stream; and
programming the state register in a register file of a processing block.

5. The method of claim 4, further comprising:
updating state data, without broadcasting the updated state data to the register bus, of one or more internally-kept-state registers within the processing block.

6. The method of claim 4, further comprising:
receiving a power state change signal and writing state register data saved at the local memory to an off-chip memory prior to changing the power state of the parallel processor.

7. The method of claim 6, wherein receiving the power state change signal comprises receiving a power collapse signal instructing power down of the parallel processor.

8. A parallel processor, comprising:
a power controller circuit communicably coupled to one or more processing blocks, wherein the power controller circuit is configured to detect one or more register write signals, and further wherein the power controller circuit determines that a register write signal is addressed to a state register that is designated to be saved prior to changing a power state of the parallel processor from a first state to a second state having a lower level of energy usage; and
a local memory of the parallel processor configured to receive a copy of data corresponding to the state register.

9. The parallel processor of claim 8, wherein the power controller circuit is configured to detect the one or more register write signals by monitoring a register bus communicably coupling the power controller circuit to the one or more processing blocks for register write broadcasts.

10. The parallel processor of claim 8, wherein the power controller is configured to receive a power state change signal and write state register data saved at the local memory to an off-chip memory prior to changing the power state of the parallel processor.

11. The parallel processor of claim 9, further comprising:
a command processor communicably coupled to the register bus, wherein the command processor is configured to receive a command from a command stream and transmit the register write signal via the register bus based at least in part on the command.

12. The parallel processor of claim 11, wherein the command processor is configured to decode the command from the command stream and program, based at least in part on a register address of the decoded command, the state register in a register file of the one or more processing blocks.

13. The parallel processor of claim 12, wherein the register file includes a first set of state registers designated to be saved prior to changing a power state and a second set of state registers designated as internally-kept-state registers.

14. The parallel processor of claim 13, wherein the one or more processing blocks update one or more of a second set of state data without broadcasting the updated one or more of the second set of state data to the register bus.

15. An apparatus, comprising:
a host processor communicably coupled to a parallel processor and an apparatus memory;
a power controller circuit communicably coupled to one or more processing blocks of the parallel processor, wherein the power controller circuit is configured to detect one or more register write signals, and further wherein the power controller circuit determines that a register write signal is addressed to a state register that is designated to be saved prior to changing a power state of the parallel processor from a first state to a second state having a lower level of energy usage; and
a local memory of the parallel processor configured to receive a copy of data corresponding to the state register.

16. The apparatus of claim 15, further comprising:
a command processor communicably coupled to a register bus that communicably couples the power controller circuit to the one or more processing blocks, wherein the command processor is configured to receive a command from a command stream and transmit the register write signal via the register bus based at least in part on the command.

17. The apparatus of claim 16, wherein the command processor is configured to decode the command from the command stream and program, based at least in part on a register address of the decoded command, the state register in a register file of the one or more processing blocks.

18. The apparatus of claim 17, wherein the one or more processing blocks update one or more of a second set of state data without broadcasting the updated one or more of the second set of state data to the register bus.

19. The apparatus claim 15, wherein the power controller circuit is configured to receive a power state change signal and write state register data saved at the local memory of the parallel processor to the apparatus memory prior to changing the power state of the parallel processor.

20. The apparatus of claim 15, wherein the power controller circuit is configured to monitor a register bus communicably coupling the power controller circuit to the one or more processing blocks for register writes broadcast on the register bus.

* * * * *